Feb. 23, 1932.　　　C. H. WHITE　　　1,846,663
GANG ANGLING MECHANISM FOR DISK HARROWS
Filed June 25, 1928　　　4 Sheets-Sheet 1

Witness
Milton Lenoir

Inventor.
Charles H. White,
By Brown, Jackson, Boettcher & Dienner.
Attorneys.

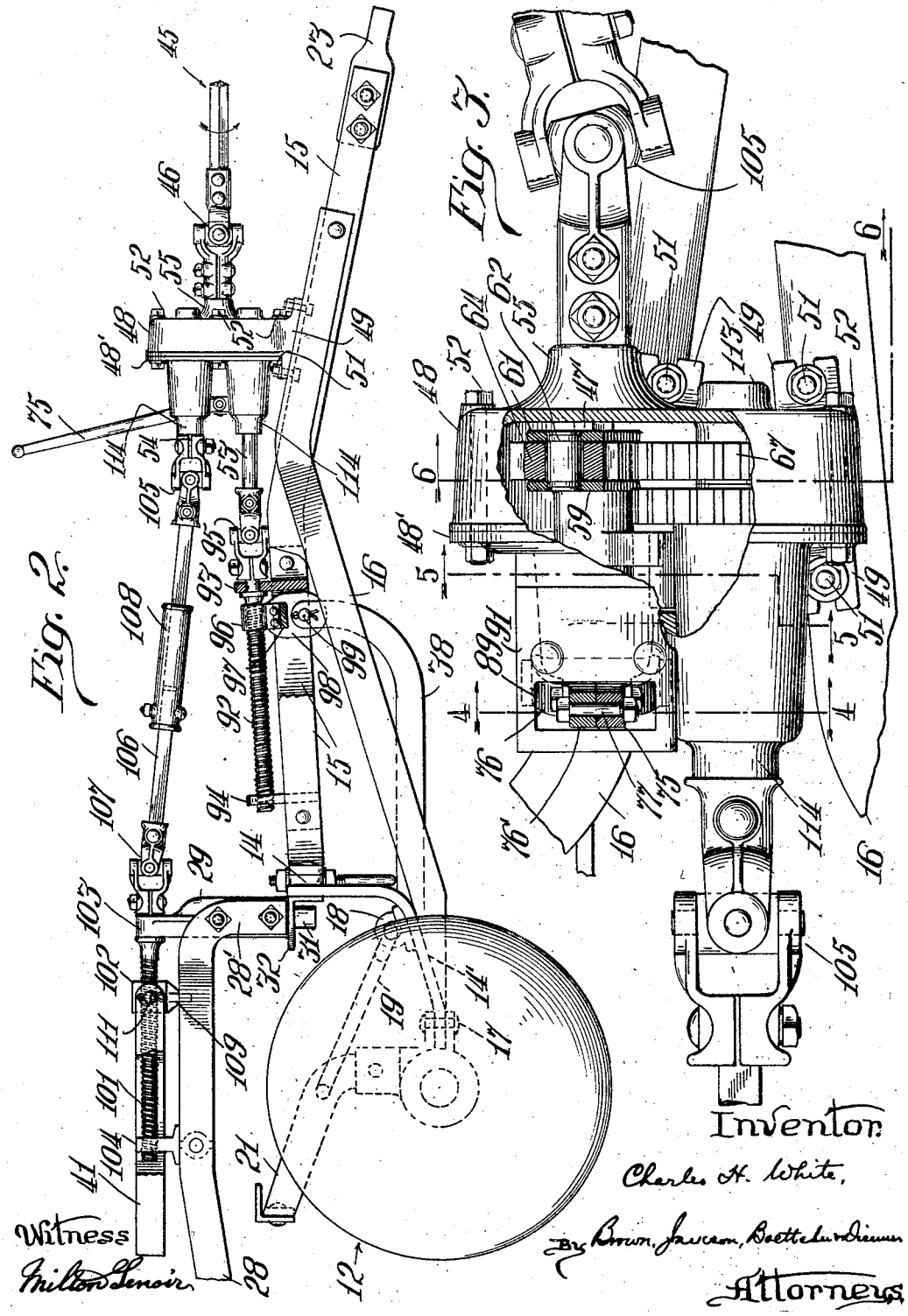

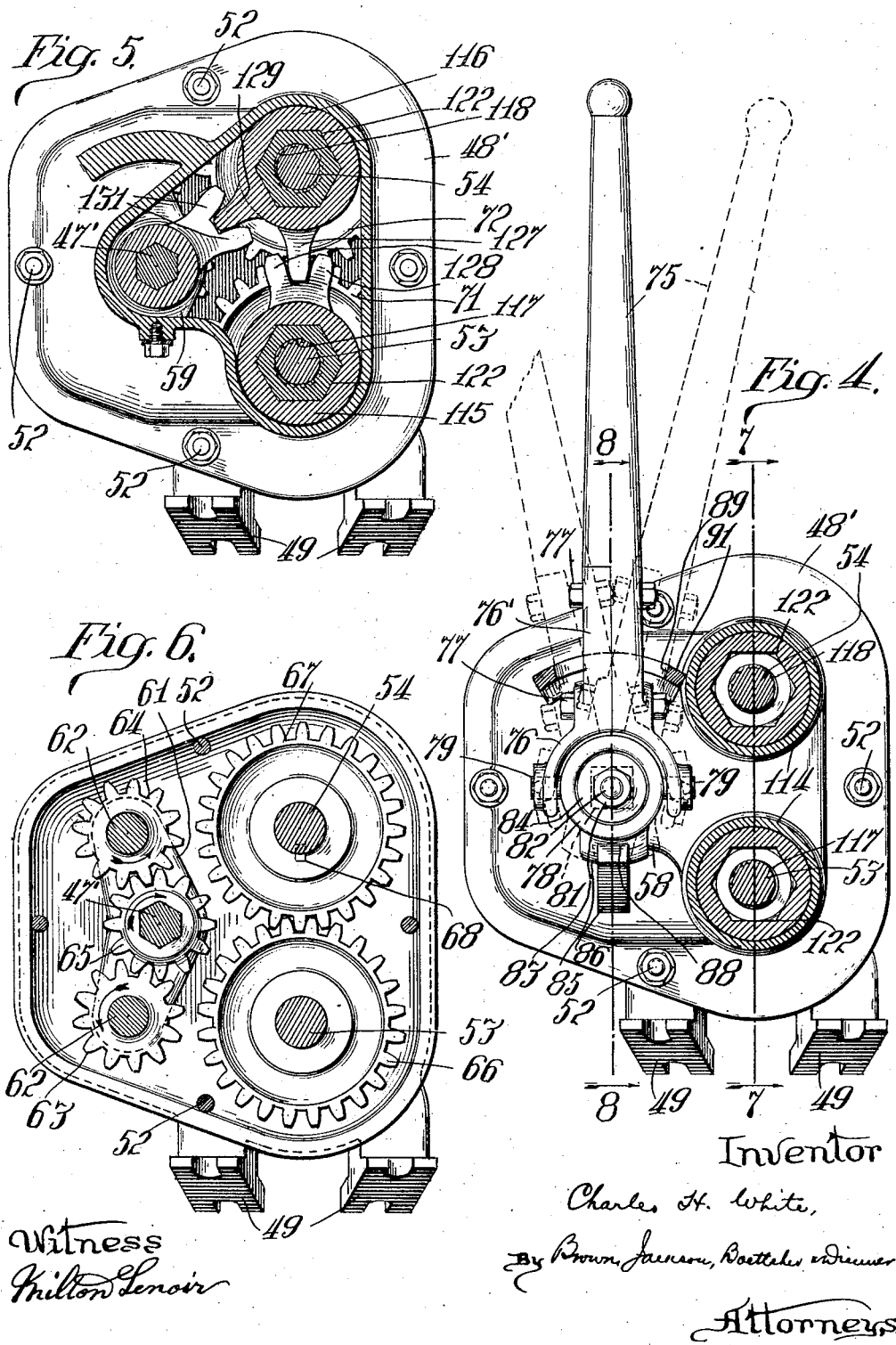

Feb. 23, 1932.　　　C. H. WHITE　　　1,846,663
GANG ANGLING MECHANISM FOR DISK HARROWS
Filed June 25, 1928　　　4 Sheets-Sheet 4
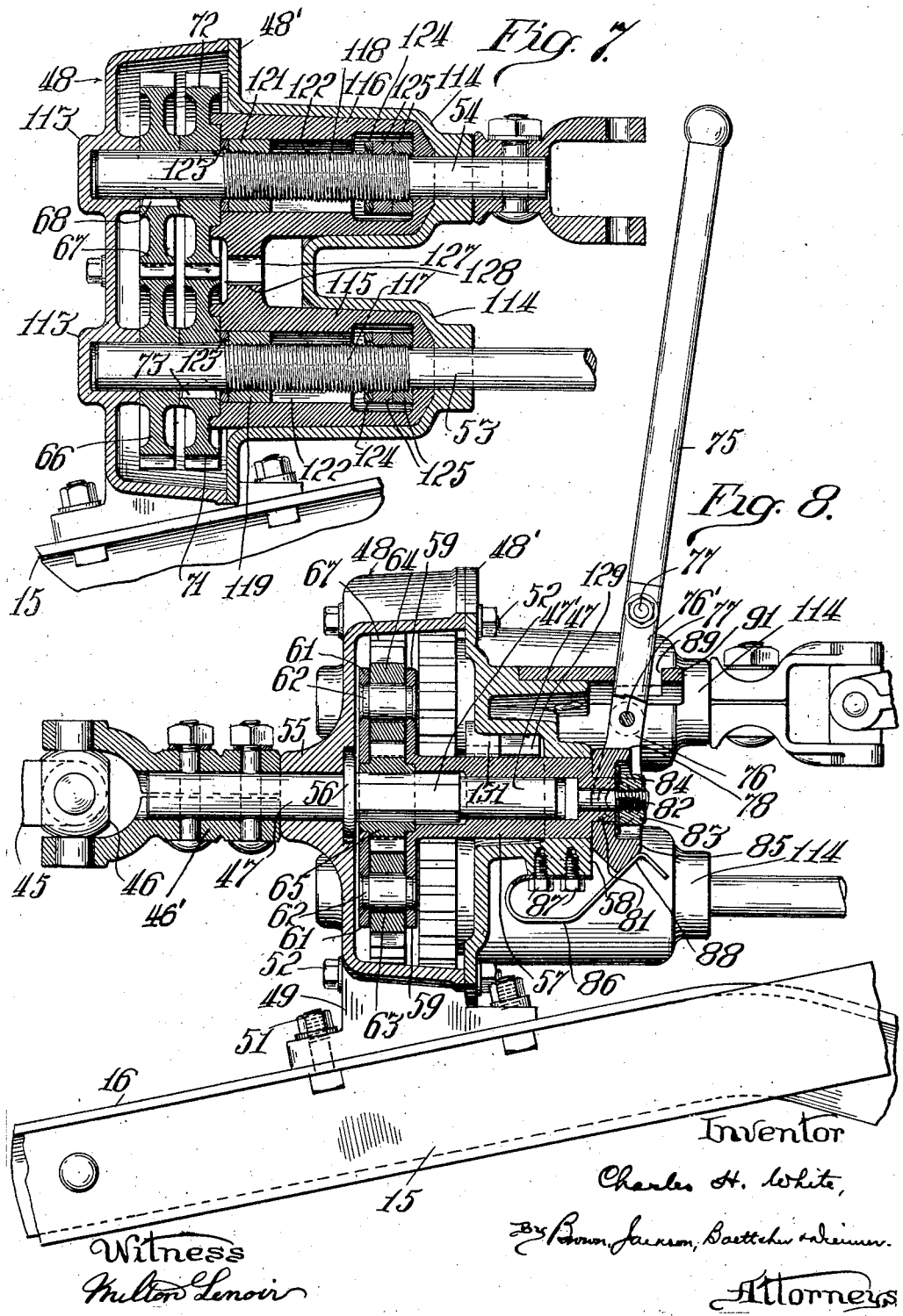
Inventor
Charles H. White,
By Brown, Jackson, Boettcher & Dienner.
Attorneys
Witness
Milton Lenoir Patented Feb. 23, 1932

1,846,663

UNITED STATES PATENT OFFICE

CHARLES H. WHITE, OF MOLINE, ILLINOIS, ASSIGNOR TO DEERE & COMPANY, OF MOLINE, ILLINOIS, A CORPORATION OF ILLINOIS

GANG ANGLING MECHANISM FOR DISK HARROWS

Application filed June 25, 1928. Serial No. 287,942.

The present invention relates generally to disk harrows designed to be drawn by a tractor, and has particularly to do with the provision of mechanism by which the power of the tractor may be utilized in varying the angular position of the disk gangs.

One of the principal objects of the invention is to provide gang angling mechanism for disk harrows which will derive its operating power from a power take-off shaft on the tractor, and which will be effective either to angle the gangs or to straighten the same while the tractor is traveling forwardly or while the tractor is standing stationary. The majority of prior gang angling mechanisms with which I am familiar have necessitated a certain relative movement between the tractor and the harrow or a backing of the tractor to effect the angling of the gangs or the straightening thereof. This is generally objectionable because the necessity of stopping and backing the tractor, or of causing a predetermined relative movement between the tractor and the harrow, frequently slows up the soil tilling operations of the harrow and reduces the general efficiency of the implement.

Moreover, with such prior constructions it is frequently difficult to extricate the tractor and harrow when the tractor has become mired in extremely soft soil. At such time the tractor may only be able to move its own weight so that it cannot obtain the necessary traction to transmit the required gang angling power to the harrow for straightening the gangs. Such objections and difficulties are avoided in the present construction by virtue of the fact that the gangs can be either angled or straightened while the tractor is traveling straight ahead, or can be angled or straightened while the tractor is standing stationary.

Another object of the invention is to provide improved gang angling mechanism for a tandem disk harrow which will be capable of selectively angling or straightening the front set of gangs or the rear set of gangs while the tractor is traveling forwardly or while the tractor is standing still. This ability to quickly and easily adjust the cutting angle of one pair of gangs independently of the other pair of gangs is of advantage because it is frequently desirable to set both pairs of gangs at different angles in order that they will have the maximum tilling effect. For example, the front pair of gangs normally engages with rather firm soil whereas the rear pair of gangs engages in soil that has been broken up or loosened to some extent by the front pair of gangs, and hence for maximum tilling efficiency it may be desirable to set the two pairs of gangs at different cutting angles.

A further object of the invention is to provide gang angling mechanism in which each of the aforesaid operations can be controlled by the operator from his driving position on the tractor. The operating principle of the mechanism and the manner in which the same is controlled are such that the gangs can be quickly adjusted to any desired angle, and the adjustments may be of infinitely small gradations.

Other objects and advantages of the invention will appear in the following description of a preferred embodiment thereof. In the accompanying drawings illustrating such embodiment:

Fig. 2 is a fragmentary side view of the front portion of the implement, illustrating the gang angling mechanism in side elevation.

Fig. 3 is a plan view of the gang angling mechanism on a larger scale, a portion of the housing being broken away to illustrate the interior construction.

Figure 1:
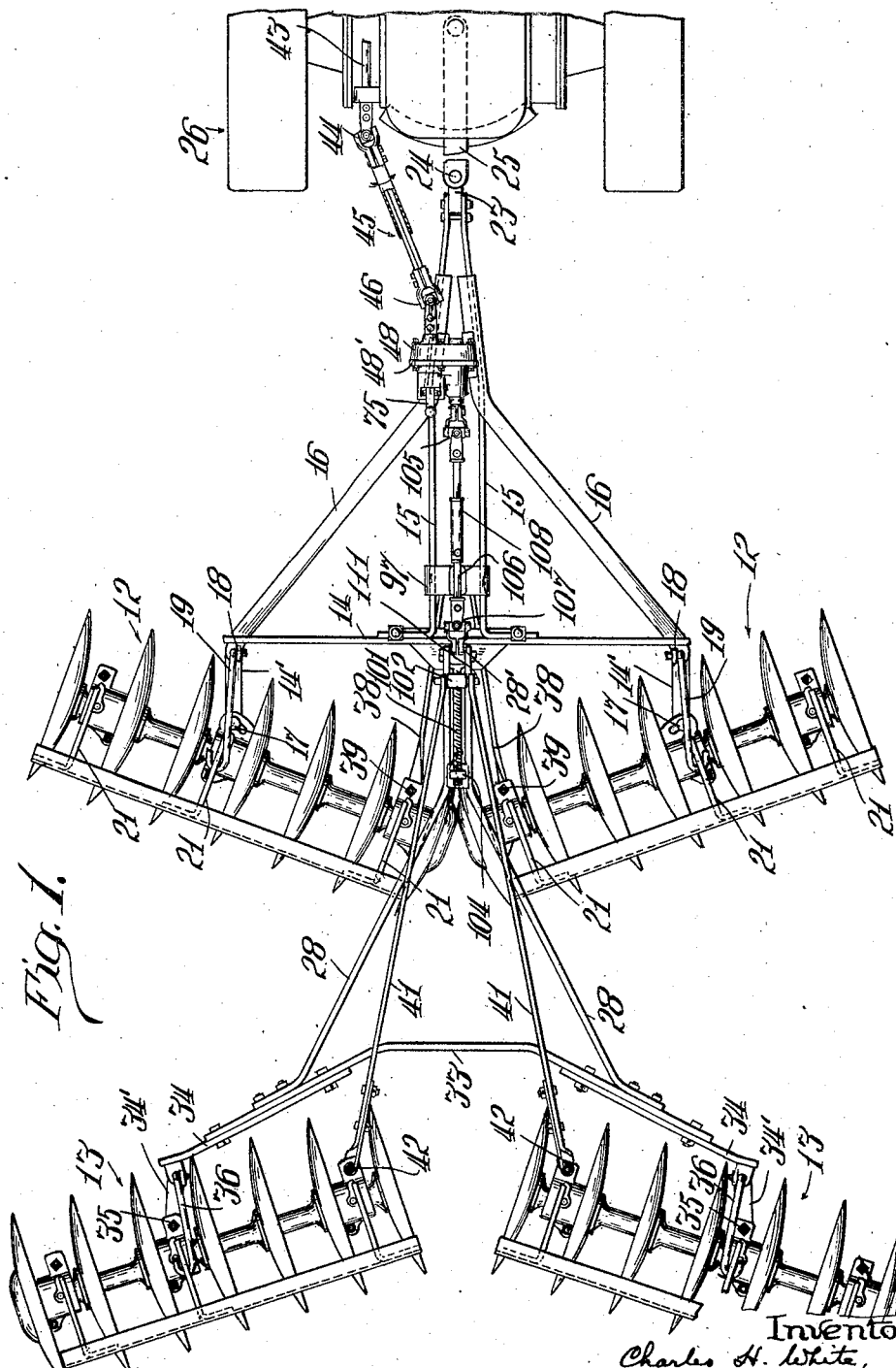
Fig. 1 is a plan view of the present disk harrow, illustrating the operating connection between the harrow and the tractor.

Figs. 4, 5 and 6 are vertical sectional views taken on the planes of the lines 4—4, 5—5 and 6—6 respectively of Fig. 3.

Fig. 7 is a vertical sectional view taken on the plane of the line 7—7 of Fig. 4, and illustrating the manner of transmitting the selective drive to the two rearwardly extending shafts; and Fig. 8 is a vertical sectional view taken on the plane of the line 8—8 of Fig. 4 and illustrating the control connections of the gang angling mechanism.

The harrow may be of any desired construction characterized by a front pair of adjustable disk gangs 12 and a rear pair of disk gangs 13. The construction of each gang need not be described, as the same are well known. Similarly the frame of the harrow may be of any suitable construction, although the type of frame shown embodies certain features having application to the present mechanism. In such construction the front portion of the frame comprises a transverse bar 14 to the intermediate portion of which are secured two forwardly extending frame bars 15—15. This front portion of the frame is braced by two diagonal brace bars 16—16, which extend from the front portions of the longitudinal bars 15 to the outer ends of the transverse bar 14. Said brace bars are of angle cross section having their vertical flanges riveted or bolted to the outer sides of the longitudinal frame bars 15 and having their horizontal flanges extending inwardly across the upper edges of the bars 15, as best shown in Figs. 1 and 2. The ends of the transverse bar 14 are bent downwardly and rearwardly to form the pivot extensions 14', to the ends of which the two front gangs 12 are pivotally connected at 17. The rear ends of the diagonal brace bars 16 are suitably secured to the under sides of the pivot extensions 14'. Brackets 18 having eyes formed thereon are secured to the upper sides of the pivot extensions 14' and links 19 extend from these eyes to bars 21 constituting members of the gang frames, the links 19 serving to hold these gang frames in an upright position. Referring to Fig. 2, it will be seen that the longitudinal frame bars 15 are arched or bent upwardly intermediate their ends and have their downwardly inclined front ends bolted to the opposite sides of a coupling member 23, which is adapted to have pivotal connection at 24 with a rigid or swinging draw bar 25 carried by the tractor 26.

The rear portion of the harrow frame comprises two diagonal frame bars 28—28, the forward portions of which extend in parallelism and are bent downwardly at their ends as indicated at 28' in Fig. 2 for bolting to the opposite sides of a mounting or pivot standard 29. This pivot member has a pivot stud 31 extending downwardly through an angularly shaped bracket 32 which is secured to the rear side of the transverse frame bar 14 substantially at the center thereof. The pivotal connection 31 permits the rear frame bars 28 to swing laterally to enable the pair of rear gangs 13 to position themselves properly with respect to the front gangs and to permit the rear gangs to swing in the turning movement of the harrow. The rear ends of the bars 28 are secured to a forwardly arched frame bar 33, and to the ends of this latter bar are secured separate bar members 34 having rearwardly projecting pivot extensions 34' to which the rear gangs 13 are pivoted at 35. These rear gangs are also provided with links 36 pivotally coupled between frame members of the gangs and eyes on the pivot extensions 34', similarly to the links 19 of the front gangs, for holding the frames of the rear gangs in their proper upright position. In angling or straightening the front pair of gangs 12 the inner ends thereof are thrust rearwardly or pulled forwardly through the medium of two links 38 which are pivotally connected at 39 to the inner portions of the gangs. Similarly, in angling or straightening the rear pair of gangs 13 the inner ends thereof are pulled forwardly or thrust rearwardly through the medium of two links 41 which are pivotally connected at 42 to the inner portions of the gangs. I shall now describe the operating mechanism which serves to impart forward and rearward movement to these two pairs of links 38 and 41.

The tractor 26 is provided with a suitable power take-off device typically represented by the shaft 43 projecting rearwardly from the tractor in Fig. 1. The end of this power take-off shaft has connection through a universal joint 44 with a telescopic shaft 45 comprising two telescoping shaft sections which have relative sliding movement to accommodate the change in angle between the tractor and the harrow when the implement is being turned at the end of the field. The rear end of the telescopic shaft 45 has connection through a universal joint 46 with a shaft 47 which constitutes the driving element of the gang angling mechanism. It will be understood that this latter shaft derives its power from the engine of the tractor, either rotating constantly with the operation of the engine or being adapted to have its drive controlled by a suitable clutch such as might be interposed between the tractor engine and the power take-off shaft 43.

Referring to Fig. 8, it will be seen that the drive shaft 47 enters a housing 48 which is mounted on the front portion of the harrow frame, such housing extending transversely of the front portions of the diagonal frame bars 16 and having mounting legs or feet 49 which are bolted at 51 to the inwardly projecting top flanges 16' of the brace bars 16. The housing is of two part construction comprising the front section 48 and the rear section 48', the two sections being secured together by bolts 52. As shown in Figs. 5 and 6, the drive shaft 47 is disposed in one side of the housing, and journaled in the other side thereof are two driven shafts 53 and 54 which transmit power to adjust the front and rear gangs respectively, as will be presently described.

Referring again to Fig. 8, the driving shaft 47 is journaled in a bearing boss 55 projecting forwardly from the housing 48, and is held against shifting longitudinally therein by the split hub 46' of the universal joint 46 bearing against the front end of this boss, and by a collar 56 on the shaft bearing in a recess in the rear end of the boss. Mounted within the housing 48 for sliding and rocking movement on the drive shaft 47 is a selector member 57 in the form of a sleeve in which the cylindrical rear end of the drive shaft has bearing support. The rear end of said sleeve in turn has slidable and rockable bearing support in a guide boss 58 extending rearwardly from the rear housing section 48'. The front end of the sleeve 57 is formed with two outwardly extending arms 59. Spaced forwardly from these arms is a plate member having two similarly extending arms 61 which are secured to the arms 59 by rivets or screws 62 extending through alined apertures in both pairs of arms. These connecting members 62 comprise enlarged intermediate portions, or have spacing sleeves mounted thereon for maintaining the two pairs of arms in rigid relation and at a definite spacing. Mounted on these enlarged intermediate portions are two spur pinions 63 and 64 which are adapted to mesh selectively with spur gears mounted on the two driven shafts 53 and 54 respectively. The two spur pinions are driven from a small gear 65 which is mounted on the drive shaft 47 between the two pairs of arms 59—61, the hub of said latter gear preferably engaging in recessed openings in the two pairs of arms. The gear 65 is mounted on a polygonal portion 47' of the drive shaft, or is suitably splined thereto, so that said gear can slide along said shaft while still being driven thereby.

Referring to Figs. 6 and 7, it will be seen that when the selector unit is shifted forwardly to the position illustrated in Fig. 8, the two spur pinions 63 and 64 thereof are in position to mesh with two intermeshing gears 66 and 67 mounted on the two driven shafts 53 and 54 respectively. That is to say, by rocking the selector unit in one direction the lower pinion 63 can be swung into mesh with the lower gear 66 for driving the latter, or by rocking the selector unit in the opposite direction the upper pinion 64 can be swung into mesh with the upper gear 67 for driving this gear. The lower gear 66 can rotate freely on the driven shaft 63, whereas the upper gear 67 is secured by a key 68 to the upper driven shaft 54 so that its rotation also results in rotation of the shaft. Hence if the lower pinion 63 is rocked into mesh with the lower gear 66, a driving rotation will be transmitted to the upper gear 67 and to the shaft 54 for rotation in one direction, the lower gear 66 at this time functioning merely as an idler between the pinion 63 and gear 67 for reversing the direction of rotation therebetween. On the other hand, if the selector unit is rocked in the opposite direction to swing the upper pinion 64 into mesh with the upper gear 67, a drive is transmitted to the upper shaft 64 in the opposite direction through the direct engagement between the pinion 64 and gear 67. It will, therefore, be seen that with the selector unit in its forward position rocking thereof in one direction is operative to transmit one direction of rotation to the driven shaft 54 and rocking thereof in the other direction is operative to transmit rotation to said shaft in the opposite direction.

The selector unit is capable of being shifted rearwardly along the drive shaft 47 to a position such as will place its two pinions 63 and 64 in the plane of a second pair of intermeshing gears 71 and 72 mounted on the driven shafts 53 and 54 respectively. In this instance, it is the lower gear 71 which is keyed to its shaft 53, as indicated at 73, the upper gear 72 rotating idly on its shaft 54. Hence with the selector unit in its rearward position, rocking thereof in one direction will swing the spur pinion 63 into mesh with the gear 71 for driving the lower shaft 53 in one direction directly through the gear 71. On the other hand, rocking the selector member in the opposite direction will swing the upper spur pinion 64 into mesh with the upper gear 72, and the latter, functioning as an idler, will transmit rotation from the pinion 64 to the gear 71 for rotating the shaft 53 in the opposite direction. It will be seen from the foregoing that by shifting the selector member to its forward position and rocking the same in one direction or the other, a drive can be transmitted to the upper shaft 54 in either direction, and that by shifting the selector member to its rearward position and then rocking the same in one direction or the other a drive can be transmitted to the lower shaft 53 in either direction.

Such shifting and rocking of the selector mechanism is effected through an operating handle 75 which extends upwardly from the housing 48 in a position for convenient operation by the operator from his seat on the tractor 26. At the lower end of said operating lever is a fork or yoke 76, one arm of which is preferably formed integral with the lever, and the other arm of which comprises a portion 76' which is set into a recess in the side of the lever and is bolted therein by bolts 77.

Such fork embraces a collar 78 and has pivotal connection therewith through trunnion pins 79 which project outwardly from the collar through bearing bosses at the ends of the yoke arms. The collar 78 is rigidly secured to the rear end of the selector sleeve member 57, being mounted on a reduced portion 81 extending rearwardly therefrom. A bolt 82 has its head engaging in the bore of the sleeve 57 and has its shank portion extending out through the end of the reduced portion 81 for receiving a nut 83, which draws a washer 84 up against the back of the collar 78, thereby rigidly securing the collar to the selector sleeve 57. Extending downwardly from the collar 78 is a detent segment 85 which is of wedge-shaped cross section, as shown in Fig. 8. Cooperating with this detent segment is a detent spring 86 which is fastened at one end by screws 87 to the bearing boss 58 of the housing section 48'. The other end of said spring is of inverted wedge-shaped outline to cooperate with the detent segment 85. When the selector member is in its forward position one side of the detent spring bears against the sloping rear side of the detent segment 85 for yieldingly holding the selector member in such position, and when the selector member is in its rear position the other surface of the detent spring bears against the front slope of the detent segment for yieldingly holding the selector member in this position. Similarly, when the selector member is in either of these positions the frictional pressure of the detent spring against the segment 85 is sufficient to hold the selector member in any of its angular positions with both pinions 63 and 64 in a neutral position or with either of these pinions in driving engagement with one of the large gears driven thereby.

The control lever 75 has fore and aft rocking movement in a transverse slot 89 cut in a stationary arcuate plate 91 which is secured ot the rear housing section 48'. Upon pulling the lever forwardly the lower end thereof rocks rearwardly around the front edge of the slot as a fulcrum, thereby shifting the selector member rearwardly, and when the lever is thrust rearwardly the lower end thereof rocks around the rear edge of the slot of the fulcrum and shifts the selector member forwardly. In either of these shifted positions the lever can also be oscillated to either end of the slot, as indicated in dotted lines in Fig. 4, for selectively engaging either of the pinions 63 and 64 with the large driven gears with which said pinions are then alined.

The rotation of the lower driven shaft 53 is made effective to adjust the front pair of gangs 12 through a threaded shaft 92 which is mounted on the front section of the harrow frame. The opposite ends of said threaded shaft are rotatably supported in bearing brackets 93 and 94, which are supported in bridging relation between the two longitudinal frame bars 15. The front end of this threaded shaft or screw is operatively connected with the driven shaft 53 through a universal joint 95, which avoids the necessity of providing accurately alined bearings for the two shafts 53 and 92. Traversing the length of the threaded shaft 92 is a nut 96 which is held against rotation with the shaft by attachment to plates or bracket devices 97 having sliding engagement along the frame bars 15, preferably along the upper edges of the latter. A plate 98 depending from the nut 96 carries a pivot 99 to which the upwardly turned forward ends of the two adjusting links 38 are pivotally connected.

It will thus be seen that rotation of the shaft 53 in one direction will cause the nut 96 to travel toward one end of the screw 92 for adjusting the angle of the front gangs in one direction, and that rotation of the shaft 53 in the opposite direction will cause the nut 96 to traverse the screw 92 in the opposite direction for shifting the gangs reversely.

The rotation of the upper driven shaft 54 is effective to adjust the rear pair of gangs 13—13 through a similar arrangement of threaded shaft 101 and a traveling nut 102 mounted thereon. The front end of the latter threaded shaft has bearing support in a boss 103 at the upper end of the swiveling pivot block 29, and the rear end of said shaft has bearing support in a bracket 104 mounted on the bars 28 of the rear frame section. The driven shaft 54 is operatively connected through a universal joint 105 with an intermediate shaft 106, the rear end of which is connected through a universal joint 107 with the threaded shaft 101. Owing to the fact that the threaded shaft 101 is frequently inclined laterally with respect to the driven shaft 54, resulting from the lateral swinging movement of the rear frame section 28, the intermediate shaft 106 must be extensible to permit of this relative angulation. Such is provided for by constructing the intermediate shaft 106 in two sections and connecting the same through a telescopic sleeve coupling 108. The traveling nut 102 has a depending guide portion 109 which engages between the parallel portions of the frame bar 28 and which holds the nut against rotation. The two links 41 which transmit angular adjusting motion to the rear gangs 13 engage over pivot pins 111 projecting laterally from the nut 102.

It will thus be seen that rotation of the driven shaft 54 in one direction will cause the nut 102 to travel forwardly along the screw 101 for angling the rear gangs, and rotation of the shaft 54 in the opposite direction will cause the nut 102 to travel rearwardly along the screw 101 for straightening the rear gangs. Attention is also directed to the fact that this adjustment of the rear gangs can be effected at any time notwithstanding the fact that such gangs may be slewed laterally to one slide or the other, since driving rotation will still be transmitted to the screw 101 through the universal joints 105–107 and telescopic coupling 108.

Through inadvertence or carelessness the operator may continue the rotation of one or the other of the feed screws 92–101 until the traveling nut thereon reaches the end of its effective limit of travel, at which time breakage of the parts is likely to occur unless means is provided for automatically interrupting the transmission of power to the screw. I provide such means within the housing 48, consisting of stop nuts traveling along threaded portions of the shafts 53 and 54 and effective to oscillate the selector unit to neutral position after either shaft has been rotated through a predetermined number of revolutions in one direction or the other. Referring to Fig. 7, the front ends of the two driven shafts 53 and 54 have bearing support in bosses 113 in the front section of the housing, and the rear portions of such shafts have bearing support in relatively long tubular bearing bosses 114 extending from the rear housing section 48'.

Oscillatable within these tubular bosses are two disconnecting elements in the form of sleeves 115 and 116 which have front ends bearing on the gears 71 and 72, and which have closed rear ends mounted on the shafts 53 and 54. That portion of each shaft extending through these sleeves is provided with a relatively fine thread 117—118. Screwing along these threads are nuts 119 and 121 which travel endwise in polygonal bores 122 in the disconnecting sleeves, the latter holding the nuts against rotation with the shafts. The travel of the two stop nuts 119—121 in a forward direction is limited by their engagement with spring washers 123, which bear against the gears 71—72. The travel of the stop nuts in the other direction is similarly limited by spring washers 124, which are held at definite points on the two shafts by check nuts 125. The location of each spring washer 124 along its shaft can be adjusted by screwing the two check nuts 125 forwardly or rearwardly along the shaft. It will be evident that when either stop nut engages one or the other of the washers 123 or 124, its travel in that direction is interrupted and in consequence a locked condition is established between the rotating shaft and the disconnecting sleeve so that the latter is oscillated in the same direction of rotation as the shaft. The resiliency of the spring washers 123—124 provides a cushioning action which yieldingly establishes this locked condition. The resultant oscillation of the disconnecting sleeve is transmitted to the selector member 57 for oscillating the latter to neutral position.

Referring to Fig. 5, which illustrates the mechanism whereby this is accomplished, it will be noted that the two sleeves 115 and 116 are interconnected for joint oscillation through a tooth 127 extending downwardly from the sleeve 116 and engaging between two teeth 128 on the other sleeve 115. The upper sleeve 116 also carries a laterally extending tooth 129 which engages between two teeth 131 on the selector sleeve 57. The operation of this automatic throw-out mechanism will be best understood by considering the directions of rotation of the various gears. It will be assumed that the drive shaft 47 and drive gear 65 rotate in a clockwise direction as viewed in Fig. 6. If the lower drive pinion 63 is in mesh with the lower reverse idler 66 or with the lower drive gear 71, it will be evident that clockwise oscillation transmitted to the two throw-out teeth 131 will oscillate the drive pinion 63 out of mesh with either of the aforesaid gears. Such results as follows: If the pinion is in mesh with the idler 66 a counter-clockwise rotation is being transmitted to the upper shaft 64, and when the stop nut 121 reaches the end of its travel thereon it causes a counter-clockwise oscillation of the sleeve 116, which operates through the tooth 129 to transmit a clockwise oscillation to the selector sleeve 57 for throwing the drive pinion 63 out of mesh. If the drive pinion 63 is in mesh with the lower keyed gear 71 a clockwise rotation is being transmitted to the lower driven shaft 53, and when the stop nut 119 thereon reaches the end of its travel it imparts a clockwise oscillation to the sleeve 115 which transmits a counter-clockwise oscillation to the upper sleeve 122 through the tooth 127, and the latter sleeve in turn transmits a clockwise oscillation to the selector sleeve 57 for throwing the pinion 63 out of mesh.

Assuming now, on the other hand, that the upper drive pinion 64 is in mesh with either the upper keyed gear 67 or the upper reverse idler 72, it will be evident that counter-clockwise oscillation must be transmitted to the selector sleeve to throw this drive pinion out of mesh. If at this time the drive pinion is in mesh with the keyed gear 67 a clockwise rotation is being transmitted to the upper driven shaft 54, and when the stop nut thereon reaches the end of its travel a clockwise oscillation is imparted to the sleeve 116, which in turn oscillates the selector sleeve 57 in a counter-clockwise direction for throwing the pinion 64 out of mesh. If the pinion 64 is in mesh with the reverse idler 72 a counter-clockwise rotation is being transmitted to the lower driven shaft 53, and when the stop nut 119 thereon reaches the end of its travel it oscillates the sleeve 115 in a counter-clockwise direction, which oscillates the upper sleeve 116 clockwise and the latter in turn oscillates the selector sleeve counter-clockwise for throwing the pinion 64 out of mesh. The location of the stop nut 119 along its thread 117 always corresponds substantially to the location of the traveling nut 96 along its thread 92, and the two washers 123 and 124 are so adjusted relatively to each other that the stop nut 119 will always function to interrupt the transmission of power to the screw 92 before the traveling nut 96 reaches either end thereof. The same relation is true between the stop nut 121 and the traveling nut 102. In the automatic throw-out operation the application of power to the selector sleeve for rocking the same to neutral position will result in a forced oscillation of the control lever 75 in opposition to any pressure which the operator may be exerting thereon.

It will be seen from the foregoing that the operator from his driving position on the tractor can angularly adjust selectively either the front set of gangs or the rear set of gangs while the tractor is in motion or while it is standing stationary. By pulling the control lever 75 forwardly and rocking the same to one side or the other he can strighten or angle the front pair of gangs to any desired position. Similarly by pushing the control handle rearwardly and rocking the same to one side or the other he can straighten or angle the rear pair of gangs to any desired position. If the tractor becomes mired in soft ground both pairs of gangs can be straightened while the tractor is remaining stationary, so as to minimize the draft load on the tractor to enable it to extricate itself. In all of these adjusting operations the automatic throw-out mechanism exercises a safety control so that the working range of angular adjustment of each pair of gangs in either direction cannot be exceeded.

I wish it to be understood that while I have described specifically a certain preferred construction illustrated in the drawings, my invention is not limited to that particular construction, but includes such variations or modifications as would occur to those skilled in the art. The claims hereinafter made are, therefore, to be construed accordingly.

I claim:

1. A disk harrow adapted to be propelled by a tractor, comprising disk gangs, gang shifting mechanism adapted to derive its power from a power take-off connection on the tractor and operative to shift the disk gangs, and means for automatically interrupting the operation of said mechanism when said gangs have been shifted to a predetermined degree.

2. A disk harrow adapted to be propelled by a tractor, comprising tandem disk gangs, an engine-driven power take-off connection adapted to extend between the tractor and harrow, and mechanism mounted on the harrow and driven by said power take-off connection for selectively shifting the front and rear disk gangs, said mechanism comprising means for automatically limiting the shifting of the gangs.

3. A disk harrow adapted to be propelled by a tractor, comprising disk gangs adjustable between angled and straightened positions, a rotating drive shaft adapted to extend between the tractor and the harrow and adapted to derive its power from the engine of the tractor, and gang angling mechanism including reversing means mounted on the harrow, said mechanism being capable of being driven in either direction from said shaft through said reversing means for angling or straightened the gangs.

4. A disk harrow adapted to be propelled by a tractor comprising tandem disk gangs, a power take-off connection adapted to extend between the tractor and harrow and adapted to derive its energy from the engine of the tractor, mechanism mounted on the harrow and driven by said power take-off connection for angularly shifting the front and rear gangs, and means for automatically interrupting the operation of said mechanism when either of said gangs has been shifted to a predetermined degree.

5. A disk harrow adapted to be propelled by a tractor, comprising tandem disk gangs. a rotary drive shaft adapted to extend between the tractor and the harrow and adapted to derive its power from the engine of the tractor, screw means for angularly adjusting the front pair of gangs, screw means for angularly adjusting the rear pair of gangs, and means for selectively transmitting power from said rotating drive shaft to either of said screw means.

6. A disk harrow adapted to be propelled by a tractor, comprising tandem disk gangs. a rotating drive shaft adapted to extend between the tractor and the harrow and adapted to derive its power from the engine of the tractor, screw means for angularly adjusting the front pair of gangs, screw means for angularly adjusting the rear pair of gangs, and means for selectively establishing a power transmitting relation between said drive shaft and either of said screw means for rotating the selected screw means in either direction.

7. A disk harrow adapted to be propelled by a tractor, comprising front and rear pairs of disk gangs, a rotating drive shaft adapted to extend between the tractor and the harrow and adapted to derive its power from the engine of the tractor, mechanism for angularly shifting the front pair of gangs, mechanism for angularly shifting the rear pair of gangs, and control means operative from the driver's position on the tractor for selectively establishing a driving engagement between said shaft and either of said mechanisms and operative to drive the selected mechanism in either direction.

8. A disk harrow adapted to be propelled by a tractor, comprising front and rear disk gangs, a rotating drive shaft adapted to derive its power from the engine of the tractor, two driven shafts, mechanism actuated by one of said shafts for angularly shifting the front gangs, mechanism actuated by the other of said driven shafts for angularly shifting the rear gangs, and selector gearings operative to establish a driving relation between said drive shaft and either of said driven shafts for driving the selected driven shaft in either direction.

9. A disk harrow adapted to be propelled by a tractor, comprising front and rear disk gangs, a rotating drive shaft adapted to extend between the tractor and the harrow and adapted to derive its power from the engine of the tractor, two driven shafts, mechanism actuated by one of said driven shafts for angularly shifting the front gangs, mechanism actuated by the other of said driven shafts for angularly shifting the rear gangs, gears on said driven shafts, selector gear mechanism associated with said drive shaft and shiftable and rockable to establish a driving relation between said drive shaft and either of said driven shafts for driving the selected driven shaft in either direction, and means for preventing the transmission of gang shifting power to said gangs after the latter have been shifted to predetermined positions.

10. A disk harrow adapted to be propelled by a tractor, comprising front and rear disk gangs, a rotating drive shaft adapted to extend from the tractor to the harrow and adapted to derive its power from the engine of the tractor, two driven shafts, means actuated by one of said driven shafts for angularly adjusting the front gangs, means actuated by the other of said driven shafts for angularly adjusting the rear gangs, a driven gear secured to each of said driven shafts, an associated idler gear meshing with each of said driven gears, a selector member comprising two drive gears rotating with said drive shaft, and means for shifting and rocking said selector member to mesh said drive gears selectively with either of said driven gears or with either of said idler gears.

11. A disk harrow adapted to be propelled by a tractor, comprising front and rear disk gangs, a rotating drive shaft adapted to extend between the tractor and harrow and adapted to derive its power from the engine of the tractor, two driven shafts, one of said driven shafts being operatively connected to angularly shift the front gangs and the other of said driven shafts being operatively connected to angularly shift the rear gangs, a driven gear secured to each of said driven shafts, an idler gear meshing with each of said driven gears and mounted on the other of said driven shafts, a selector member comprising two drive gears rotating with said drive shaft, and control means operative to shift said selector member for placing said drive gears in the plane of either of said driven gears and for rocking said selector member to mesh said drive gears either with one of said driven gears or its associated idler gear.

12. A disk harrow adapted to be propelled by a tractor, comprising front and rear disk gangs, a drive shaft adapted to extend between the tractor and harrow and adapted to derive its power from the engine of the tractor, a first driven shaft operatively connected to angularly shift the front gangs, a second driven shaft operatively connected to angularly shift the rear gangs, a first driven gear and a first idler gear mounted on the first driven shaft, a second driven gear and a second idler gear mounted on said second driven shaft, said idler gears meshing with the opposite driven gears, a selector unit comprising first and second drive pinions rotating with said drive shaft, and control means for shifting and rocking said selector unit to mesh said first pinion either with said first driven gear or said first idler gear, or to mesh said second pinion either with said second driven gear or said second idler gear.

13. A disk harrow adapted to be drawn by a tractor, comprising front and rear disk gangs, a rotating drive shaft adapted to be connected between the tractor and harrow and adapted to derive its power from the engine of the tractor, first and second driven shafts operatively connected to angularly shift the front and rear gangs, a first pair of intermeshing gears mounted on said driven shafts, the gear mounted on said first driven shaft being secured thereto, a second pair of intermeshing gears mounted on said driven shafts, the gear of said second pair mounted on said second driven shaft being secured thereto, a selector sleeve slidably and rockably mounted on said drive shaft, arms extending from said sleeve, drive pinions supported on said arms, a drive gear on said drive shaft meshing with said pinions and control means operating through said selector sleeve for shifting said drive pinions into the plane of the first pair of gears and to rock said sleeve to mesh either of said drive pinions with either of said first pair of gears, or to shift said drive pinions into the plane of the second pair of gears and to rock either of said drive pinions into mesh with either of said second pair of gears.

14. A disk harrow adapted to be drawn by a tractor, comprising front and rear disk gangs, a rotating drive shaft on the harrow adapted to be driven from a power take-off connection on the tractor, a pair of driven shafts operatively connected to angularly shift the front and rear gangs, driven gears on said driven shafts, a selector member for establishing driving connection between said drive shaft and said gears, said selector member having a neutral position with said driving connection interrupted, and means responsive to a predetermined degree of rotation of said driven shafts for automatically moving said selector member to neutral position.

15. A disk harrow adapted to be drawn by a tractor, comprising front and rear disk gangs, a drive shaft adapted to be driven from a power take-off connection on the tractor, two driven shafts operatively connected to angularly shift the front and rear gangs, gears on said driven shafts, selector mechanism operative to establish a driving relation between said drive shaft and said gears, said selector mechanism being rockable to neutral position for interrupting the driving relation, an oscillatable throw-out sleeve surrounding each driven shaft, stop nuts traveling along threaded portions of said driven shaft within said sleeve and operative to impart oscillation to said sleeves when either of said nuts has traveled to a predetermined point along its thread, and means for transmitting such oscillation of either of said sleeves to said selector mechanism for moving the same to neutral position.

16. A disk harrow adapted to be drawn by a tractor, comprising a front frame section, a rear frame section pivoted thereto for lateral swinging movement, front and rear disk gangs connected with said front and rear frame sections, a drive shaft mounted on said front frame section, a universally jointed transmission shaft adapted to connect said drive shaft with a power take-off device on the tractor, two driven shafts mounted on said front frame section, a screw mounted on said front frame section and operatively connected to be driven by one of said shafts, a traveling nut threading over said screw, link means for transmitting the motion of said nut to said front disk gangs for angularly adjusting the same, a screw mounted on said rear frame section and swinging therewith, a universally jointed telescopic shaft operatively connecting said second screw with the other of said driven shafts, a traveling nut on said second screw, link means transmitting the motion of said latter nut to said rear pair of gangs for angularly adjusting the same, and control means for driving either of said driven shafts selectively from said drive shaft and in either direction.

17. A disk harrow adapted to be propelled by a tractor, comprising a disk gang, and gang shifting mechanism adapted to derive its power from the tractor and operative to shift said gang, said mechanism including reversing means on the harrow through which the gang can be shifted by power in either direction.

18. A harrow adapted to be propelled by a tractor, comprising a harrow section movable relatively to the line of draft, mechanism adapted to derive power from the tractor and operative to so move said section, and means for automatically interrupting the transmission of power through said mechanism when said harrow section has been moved to a predetermined position.

19. A soil working implement adapted to be propelled by a tractor, said implement comprising a frame structure, a soil working implement device movable relatively to said frame structure, mechanism adapted to derive power from the tractor and operative to move said implement device relatively to said frame structure, and means for automatically interrupting the transmission of power through said mechanism when said implement device has been moved to a predetermined position.

20. A soil working implement adapted to be propelled by a tractor, said implement comprising a frame structure, two soil working implement devices movable relatively to said frame structure, and mechanism adapted to derive take-off power from the tractor and operative to move said implement devices relatively to said frame structure when the implement is traveling or is standing stationary, said mechanism comprising selecting means for transmitting power to move said devices selectively.

21. A soil working implement adapted to be propelled by a tractor, said implement comprising a frame structure, two soil working implement devices movable relatively to said frame structures, a rotating drive shaft adapted to be connected between the tractor and implement and adapted to derive its power from the engine of the tractor, two driven shafts operatively connected to move said implement devices relatively to said frame structure, a first pair of intermeshing gears mounted on said driven shafts, one of said gears being secured to one of said driven shafts, a second pair of intermeshing gears mounted on said driven shafts, one of said latter pair of gears being secured to the other of said driven shafts, a selector sleeve slidably and rockably mounted on said drive shaft, a drive gear mounted on said drive shaft, a pair of drive pinions carried by said sleeve and meshing with said latter gear, and control means operative thru said selector sleeve to shift said drive pinions into the plane of the first pair of gears and to rock said pinions selectively into mesh with either of said gears, or to shift said pinions into the plane of the second pair of gears and to rock said pinions selectively into mesh with either of said latter gears.

22. A disk harrow adapted to be drawn by a tractor, comprising front and rear disk gangs, a rotating drive shaft adapted to be connected between the tractor and harrow and adapted to derive its power from the engine of the tractor, first and second driven shafts operatively connected to angularly shift the front and rear gangs, a first pair of intermeshing gears mounted on said driven shafts, the gear mounted on said first driven shaft being secured thereto, a second pair of intermeshing gears mounted on said driven shafts, the gear of said second pair mounted on said second driven shaft being secured thereto, and gear means driven by said drive shaft and adapted for selective meshing with the aforesaid gears.

In witness whereof I hereunto subscribe my name this 19th day of June, 1928.

CHARLES H. WHITE.